United States Patent [19]

Reust

[11] Patent Number: 4,553,028

[45] Date of Patent: Nov. 12, 1985

[54] APPARATUS AND METHOD FOR COMPENSATING ROLL OF A SCANNER PLATFORM

[75] Inventor: Dennis K. Reust, Houston, Tex.

[73] Assignee: Conoco Inc., Ponca City, Okla.

[21] Appl. No.: 407,139

[22] Filed: Aug. 11, 1982

[51] Int. Cl.$^4$ .................................................. G01J 1/20
[52] U.S. Cl. .................................... 250/201; 250/236
[58] Field of Search ............... 250/201, 203 R, 338 R, 250/358.1, 234, 235, 236; 350/6.5, 6.6, 6.7, 6.8, 6.9, 6.91, 500; 318/649; 364/167, 170, 571; 343/359, 372

[56] References Cited

U.S. PATENT DOCUMENTS

| | | |
|---|---|---|
| 3,039,002 | 6/1962 | Guerth .......................... 250/203 R |
| 3,043,907 | 7/1962 | Martin . |
| 3,057,953 | 10/1962 | Guerth . |
| 3,278,746 | 10/1966 | Fiat . |
| 3,290,506 | 12/1966 | Bertram .......................... 250/203 R |
| 3,371,161 | 2/1968 | Crovella .......................... 250/203 R |
| 3,448,271 | 6/1969 | Aldrich et al. ................... 250/203 R |
| 3,612,643 | 10/1971 | Weber .............................. 250/203 R |
| 3,634,008 | 1/1972 | Plummer et al. ...................... 355/56 |
| 4,035,805 | 7/1977 | Mobley ................................ 318/649 |
| 4,105,281 | 8/1978 | Johnson et al. ...................... 350/6.5 |
| 4,155,096 | 5/1979 | Thomas et al. ...................... 250/215 |
| 4,156,241 | 5/1979 | Mobley et al. ...................... 318/649 |

*Primary Examiner*—David C. Nelms
*Assistant Examiner*—J. Gatto
*Attorney, Agent, or Firm*—William J. Miller

[57] ABSTRACT

An apparatus and method are disclosed which monitor the position of a scanner platform and, in response to roll of the platform, compensate a scanner device mounted thereon to maintain the center lines of the angles of scan in alignment as defined by a line parallel to the direction of movement of the scanner platform relative to the object which is scanned.

4 Claims, 4 Drawing Figures

APPARATUS AND METHOD FOR COMPENSATING ROLL OF A SCANNER PLATFORM

BACKGROUND OF THE INVENTION

This invention relates generally to roll-compensating apparatus and methods and more particularly, but not by way of limitation, to apparatus and methods for compensating for the angular movement of a scanner platform about an axis which is the axis about which a scanner device mounted on the scanner platform rotates.

To obtain information from an object, there are data acquisition apparatus and methods for scanning the object. Such apparatus and methods are responsive to optical, infrared, or other suitable inputs emitted or reflected by the object as is wellknown in the art.

One such scanning apparatus functions by moving in a direction relative to the object and concurrently conducting a series of scans which cover discrete paths along the object extending transversely to the direction along which the scanner apparatus moves relative to the object. This series of scans is accomplished with a scanner device mounted on a support member so that the scanner device can rotate through a predetermined angle to scan that portion of the object which falls within the predetermined angle.

It will be appreciated that if the support member rolls or has angular movement relative to the axis of rotation of the scanning device, the end limits of the scans defined by the predetermined angle will be offset so that the ends of one scanned path will not be properly aligned with the ends of each of the other scanned paths. When such rolling occurs, the information received by the scanner device will be distorted in that the scanner device will perceive the detected information to be related to the other information received by the scanner device in a manner which is different from the actual relationship between the different items of information. Therefore, there is the need for an apparatus and method by which the scanner device can be maintained in proper relationship with the scanned object despite any roll of the support member about an axis which is the same as or parallel to the axis of rotation of the scanner device.

Various types of scanning apparatus and methods are known to the art. In U.S. Pat. No. 3,039,002 to Guerth there is disclosed an electro-optical tracking apparatus which utilizes a center line scan of one field scan to correlate with a second field scan by finding the corresponding center line of the second field scan.

In U.S. Pat. No. 3,634,008 to Plummer there is disclosed a device for panning a camera to keep the camera constantly aimed upon a stationary subject irrespective of the camera displacement.

In U.S. Pat. No. 3,278,746 to Fiat there is disclosed the concept of a mechanism which provides an electrical output signal indicative of the roll of an aircraft about a longitudinal axis. This output is utilized to dynamically position a mirror to compensate for or eliminate the effects of roll of the aircraft.

I am also aware that in the LANDSAT satellites there is a scanning apparatus which reciprocates in a raster-like manner and which obtains data during scans conducted in one direction of the reciprocating movement.

Despite the aforementioned disclosures, there is the need for a simplified roll-compensating scanning apparatus and method for maintaining the proper relationship between a scanner device mounted on a platform which is susceptible to roll and an object from which the scanner device is to receive information.

SUMMARY OF THE INVENTION

The present invention overcomes the shortcomings of the prior art by providing a novel and improved roll-compensating scanning apparatus and method. The apparatus and method control a scanner device so that the center lines of the angles of scan through which the scanner device moves are aligned whereby a line parallel to the direction of linear movement of the scanner device relative to the object includes a point from each of the aligned center lines.

Broadly, the apparatus of the present invention comprises scanner means for scanning an object along a plurality of paths. Each of these paths has two respective end points which define a respective angle with a point on the scanning means. Each angle has an imaginary center line passing through the point on the scanner means and through another point disposed on the respective path midway between the respective end points of the respective path. Furthermore, the apparatus comprises compensation means for controlling the scanner means to maintain each imaginary center line relative to each other imaginary center line so that a line intersects each of the imaginary center lines.

The method of the present invention broadly comprises the steps of detecting the amount a means for supporting the scanner means rotates about an axis and moving the scanner means relative to the support means so that a first center line passing through both the predetermined angle through which the scanner means rotates and the midpoint of a first one of the paths scanned by the scanner means is aligned with a second center line passing through the predetermined angle and the midpoint of a second one of the paths. This alignment can be defined by a line passing through each center line in parallel relationship with the direction along which the support means moves relative to the object.

Therefore, from the foregoing, it is a general object of the present invention to provide a novel and improved roll-compensating scanning apparatus and method. Other and further objects, features and advantages of the present invention will be readily apparent to those skilled in the art when the following description of the preferred embodiments is read in conjunction with the accompanying drawings.

Figure 3:
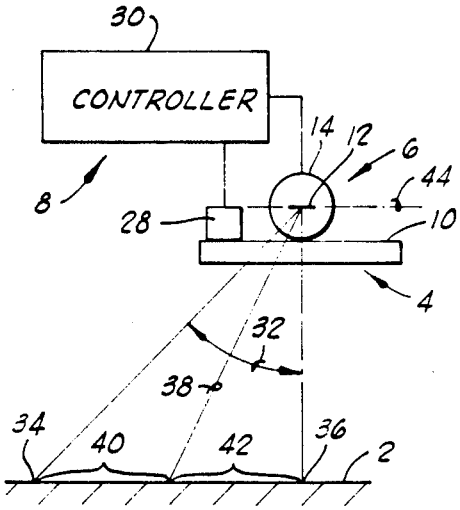
FIG. 3 is a schematic illustration of the apparatus corresponding to that shown in FIG. 1 but depicting the apparatus operating through an asymmetrical angle relative to the object.

2 but with the apparatus compensated to maintain the asymmetrical scanning relationship illustrated in FIG. 3.

DETAILED DESCRIPTION OF THE PREFERRED EMBODIMENTS

With reference to the figures the preferred embodiments of the present invention will be described. FIGS. 1-4 schematically disclose the apparatus of the present invention and different aspects of the operation of the invention. In these figures like reference numerals identify like elements.

The present invention provides a roll-compensating scanning apparatus which is used to scan an object 2. The apparatus broadly includes support means 4, scanner means 6, and compensation means 8 for controlling the scanner means 6 relative to roll of the support means 4.

The support means 4 illustrated in the figures includes a scanner platform 10 which is a structure to which one or more of the scanner means 6 is or are mounted. The scanner platform 10 is movable by suitable means (not shown) known to the art in a direction relative to the object 2. In the preferred embodiment this movement is linear and occurs either into or out of the sheet of drawings. The platform 10 is constructed so that it is susceptible to rotating, or angularly moving, relative to an axis extending in the direction in which the platform 10 moves relative to the object 2. In the preferred embodiment this axis is the axis about which the scanner means 6 rotates. However, it is to be noted that the platform 10 can rotate about an axis parallel to the axis of the scanner means 6 and still permit the present invention to provide compensation of such rotation.

The scanner means 6 is mounted on the support platform 10 by suitable means as known to the art. The scanner means 6 is any suitable device known to the art for scanning the object 2 along a plurality of paths, each of which paths has two respective end points which define a respective angle with a point on the scanner means 6. Each of these angles has an imaginary center line passing through the point on the scanner means 6 and through another point disposed on the respective path of the object 2 midway between the respective end points of the respective path.

More particularly, the scanner means 6 includes receptor means 12 for receiving input from the object 2. This input can include, for example, information conveyed by optical or infrared radiation as known to the art. In the preferred embodiment the receptor means 12 includes a flat solid beryllium mirror which is coated with a suitable dielectric coating for reflectivity and which is also coated with a suitable transparent coating for protection. This mirror is capable of reflecting laser radiation, for example. It is also contemplated that in an alternative embodiment the receptor means 12 may include a receiver means for directly receiving information from the object 2, rather than a mirror for merely reflecting the information from the object 2.

The receptor means 12 is rotated by suitable rotator means known to the art through a predetermined angle 16 relative to the object 2, thereby defining the discrete paths along the object 2 which are scanned by the present invention. The predetermined angle can be constant for each scan or can be variable as known to the art.

In the preferred embodiment the rotator means includes a motor 14 suitably coupled with the receptor means 12 so that the motor 14 continuously, intermittently, recursively or otherwise suitably rotates the receptor means 12. The rotation of the receptor means 12 occurs about an axis passing into the sheet of the drawings as the apparatus is viewed in FIGS. 1-4. This axis includes the vertex of the predetermined angle 16 through which the receptor means 12 is rotated by the motor 14. In the preferred embodiment the motor 14 is part of a BEI Ultra-Loc torque motor system which includes suitable control and drive mechanisms and which also includes a precision angle encoder for detecting the position of the shaft of the motor 14 (and thus also of the receptor means 12 connected thereto) relative to a case (not shown) in which the motor 14 is housed.

For the angle 16 through which the receptor means 12 is rotated at each position the platform 10 is moved relative to the object 2, there is defined a scanned path on the object 2 defined by end points 18 and 20 at which the limits of the scanning angle intersect the surface of the object 2. For the preferred embodiment the path defined between the end points 18 and 20 extends transversely to both the axis about which the receptor means 12 rotates and the direction in which the scanner platform 10 moves relative to the object 2. If the platform 10 moves relative to the object 2 and parallel to the axis of rotation of the receptor means 12 during scanning periods, the scanned paths will extend obliquely to the axis of rotation and direction of movement. If the platform 10 does not move during scanning periods, then the scanned paths will be perpendicular to the axis of rotation and direction of movement.

Each predetermined angle 16 through which the receptor means 12 is rotated has an imaginary center line 22 which contains the vertex of the predetermined angle 16 and the midpoint or center of the path defined between the end points 18 and 20 whereby the path is divided into two equal length segments 24 and 26. For each position of the scanner platform 10 along its path of movement along the object 2, there is a scan angle, two end points, an imaginary center line, and two segments of the scan path. That the positions of the scanner platform 10 along the direction of movement relative to the object 2 are different is denoted in FIG. 2 by the reference numerals 16a–26a.

In addition to the support means 4 and the scanner means 6, the apparatus of the present invention also includes the compensation means 8 for controlling the scanner means 6 to maintain each imaginary center line 22 positioned relative to each other imaginary center line 22a so that a line parallel to the direction in which the support means 4 moves relative to the object 2 intersects each of the imaginary center lines. In other words, the compensation means 8 controls the scanner means 6 so that each of the center lines is coplanar with each of the other center lines. More particularly, in the preferred embodiment the compensation means 8 adjusts the position of the shaft of the motor 14 and the commencement of each scan to achieve the desired scan as will be more fully described hereinbelow.

In the preferred embodiment schematically illustrated in the figures, the compensation means 8 includes detector means 28 for detecting the angle through which the support means 4 rotates about the axis of rotation of the receptor means 12. The detector means 28 is any suitable instrument known to the art, such as an inclinometer, gyroscope, pendulum or other suitable roll angle transducer.

The compensation means 8 also includes controller means 30, responsive to the detector means 28, for rotating the scanner means 6 relative to the support means 4 by an angle equal to the angle of rotation of the support means 4 about the axis of rotation of the receptor member 12 prior to the commencement of a subsequent scan. The controller means 30 is any suitable device known to the art which receives the output of the detector means 28 and provides an appropriate output to the motor 14 to control the motor 14 in properly rotating the receptor means 12 to compensate for the roll of the scanner platform 10. In the preferred embodiment the controller means 30 includes a microcomputer.

Figure 1:
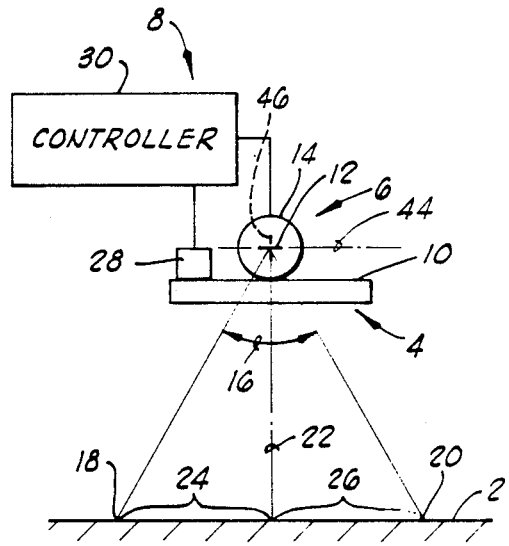
FIG. 1 is a schematic illustration of the apparatus of the present invention oriented in a reference position for symmetrically scanning an object.
Figure 2:
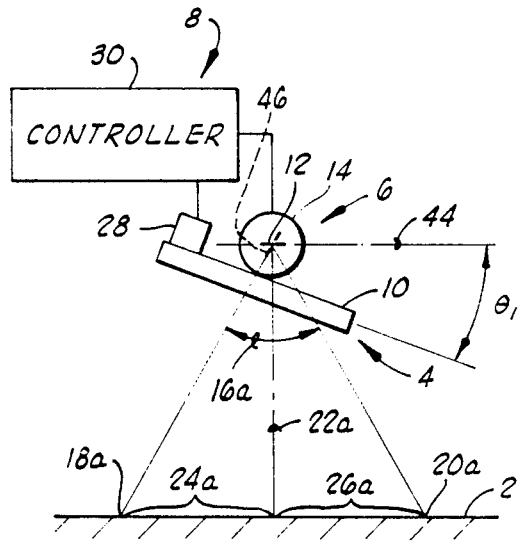
FIG. 2 is a schematic illustration of the apparatus of the present invention wherein a portion of the apparatus has rolled relative to an axis but another portion has been adjusted to maintain the symmetrical scanning relationship illustrated in FIG. 1.
Figure 4:
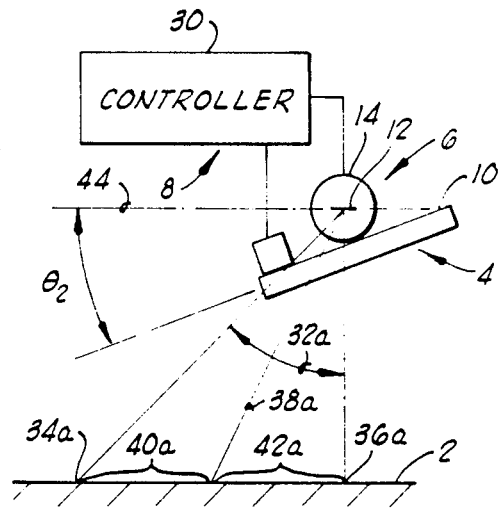
FIG. 4 is a schematic illustration of the apparatus rolled in a direction different from that shown in FIG.

It is to be noted that in FIGS. 1 and 2 the apparatus of the present invention is operated relative to the object 2 so that a symmetrical scanning angle is utilized whereby the sides of the angle 16 intersect the object 2 at equal interior angles. The apparatus illustrated in FIGS. 3 and 4 is constructed identically to that shown in FIGS. 1 and 2, but is operated so that the scanning angle is asymmetrical in that the sides of the angle intersect the object 2 at different interior angles. These two different representations are disclosed for the purpose of illustrating that the apparatus of the present invention properly functions regardless of the particular scanning angle and relationship of the apparatus with the object 2.

In FIGS. 3 and 4 the predetermined scanning angle is identified by the reference numeral 32 and the end points of the path of the object 2 defined thereby are designated by the reference numerals 34 and 36. An imaginary center line 38 divides the path into equal length segments 40 and 42. The difference between FIGS. 3 and 4 is that in FIG. 3 a first scan is made along a first path of the object 2 with the support means 4 horizontally disposed as viewed in the figures whereas in FIG. 4 the support means 4 is rolled to the right during a scan of a second path along the object 2. The scan of FIG. 4 which is different from the scan illustrated in FIG. 3 is denoted by the numerals 32a–42a.

In the operation of the present invention the apparatus is set at a predetermined reference position such as that illustrated in FIGS. 1 and 3 wherein the scanner platform 10 is parallel to a horizontal reference line 44 passing through the vertex of the predetermined scanning angle. With the scanner platform 10 in this reference position, the compensation means 8 does not need to control the scanner means 6 to compensate for any movement of the scanner platform 10. However, when the scanner platform 10 moves about the axis of rotation of the scanner means 6, then the compensation means 8 must compensate the scanner means 6 so that each of the imaginary center lines of the predetermined scanning angles is maintained in alignment with each of the other center lines. Such movement of the scanner platform 10 is termed "roll" which in the preferred embodiment is angular movement about the axis of rotation of the scanner means 6.

When the scanner platform 10 has rolled away from its reference position, the detector means 28 detects the amount by which the scanner platform has rotated. In FIG. 2 this amount is indicated by the angle $\theta_1$. In FIG. 4 this amount of roll is designated $\theta_2$.

Upon detecting this amount of roll, the detector means 28 generates a signal and communicates it with the controller means 30 which in turn generates a control signal and communicates it to the motor 14 of the scanner means 6. In response to this control signal, the motor 14 rotates the receptor means 12 relative to the scanner platform 10 by an amount equal to, but in the opposite direction of $\theta_1$ for the embodiment of FIGS. 1 and 2 or of $\theta_2$ for the embodiment of FIGS. 3 and 4. By so moving the receptor means 12 for the embodiment depicted in FIGS. 1 and 2, the first center line 22 is aligned with the second center line 22a so that a line perpendicularly intersecting these center lines extends in parallel relationship with the direction along which the scanner platform 10 linearly moves relative to the object 2. Likewise, for the embodiment illustrated in FIGS. 3 and 4, the center lines 38 and 38a are similarly aligned. By being so aligned, the center lines are likewise maintained in coplanar relationship with the axis of rotation of the scanner means 6. Stated differently, each of the center lines is maintained parallel to each other center line and intersects the axis of rotation of the scanner means 6. It is also to be noted that by maintaining the center lines in such alignment, all the end points along the same ends of the paths defined by the scanning angles are aligned when the scanning angle is the same for each scan.

The operation of the present invention will be even more particularly described with reference to a specific example utilizing the embodiment shown in FIGS. 1 and 2. It will be assumed that the motor 14 rotates, rather than reciprocates, continuously at 90 revolutions per minute (rpm). It has been found that complete rotation is preferable to reciprocation because the time required to stop and turn the preferred embodiment motor during reciprocation is too long to be practical in the present invention; however, the present invention does contemplate that reciprocation can be used where the specific equipment is suitable.

It will further be assumed that the reference position of the scanner platform 10 is in the horizontal position illustrated in FIG. 1. That is, when the platform 10 is in the position shown in FIG. 1, the roll angle is 0°. It will also be assumed that clockwise (as viewed in FIGS. 1 and 2) roll of the platform 10 yields a positive roll angle and that counterclockwise (as viewed in FIGS. 1 and 2) roll of the platform 10 yields a negative roll angle.

An additional assumption is that the reference position of the receptor means 12 (i.e., the mirror in the preferred embodiment) is achieved when the receptor means 12 shown in FIG. 1 is rotated clockwise 90°. This places the receptor means 12 facing to the left as viewed in FIG. 1 and as indicated in FIGS. 1 and 2 by the phantom representation marked with the reference numeral 46. From this reference position 46, the angle of rotation of the receptor means 12 (and thus also of the motor shaft to which the receptor means is connected) relative to the motor case (not shown) (and thus also to the platform 10 on which the case is mounted) as indicated by the encoder of the preferred embodiment is measured in a counterclockwise direction. For example, if the angle 16 were a right angle (90°). and a symmetrical scan were to be performed, the encoder of the preferred embodiment torque motor system would indicate that the receptor means 12 is at an angle of 45° when it is scanning along the line terminating in the end point 18, and the encoder would indicate an angle of 90° when the receptor means 12 is positioned as shown in FIG. 1, and the angle would be 135° when the receptor means 12 is scanning along the line terminating in the end point 20. Under the foregoing assumptions, the motor 14 is operated to continuously rotate the receptor means 12. The scanning operation is controlled so that scanning occurs only when the receptor means 12 passes between the 45° and 135° positions during each revolution of the shaft of the motor 14 as long as the platform 10 remains in its reference position illustrated in FIG. 1. Stated differently, when the scanner platform 10 is at the scanner platform reference position, the scanning angle commences at a first location (the 45° line for the present example) relative to the receptor means reference position 46.

Once the platform 10 rolls, however, then the compensation means 8 must adjust the commencement location of the scanning angle so that scanning still occurs during each revolution to maintain the center lines of each scan in the proper relationship as described hereinabove. Referring to FIG. 2 and assuming that $\theta_1$ is +15° (i.e., a clockwise roll of 15°), the compensation means 8 must in effect add this 15° to the normal angles at which the scanning occurs when the platform 10 is in its reference position. That is, if the platform 10 rolls 15° in the direction illustrated in FIG. 2, 15° must be added to the scanning sector normally defined by the 45° and 135° limits referred to hereinabove. Thus, the compensation means 8 controls the motor 14 so that scanning commences when the encoder signals that the receptor means 12 is at a position of 60° (45°+15°) and continues until the encoder signals that an angle of 150° (135°+15°) is achieved. Stated differently, the present invention controls the commencement of the scanning angle when roll occurs so that the scanning starts when the encoder indicates the receptor means (or motor shaft) is at a second location relative to the receptor means reference position 46 when the roll occurs in a direction opposite the scanning direction or so that the scanning starts when the encoder indicates the receptor means (or motor shaft) is at a third location relative to the receptor means reference position 46 when the roll occurs in the scanning direction. The second location is defined by adding the magnitude of the roll angle to the magnitude of the angular displacement of the first location measured from the receptor means reference position 46. In this example the first location magnitude is 45°. The third location is defined by subtracting the magnitude of the roll angle from the magnitude of the first location. In this example a third location would occur whenever the platform 10 rolled in a counterclockwise direction. Of course, the second and third locations will vary with the specific roll detected by the present invention. It is to be noted that rather than or in addition to controlling the motor 14, the compensation means 8 can control the operation of an accompanying data acquisition system (not shown) of the scanner means 6 and of a type known to the art to achieve the desired compensation. This control is still accomplished by the addition or subtraction of the roll angle as just described or by the corresponding time computations which will now be described.

To achieve this control by means of the microcomputer included within the preferred embodiment of the controller means 30, the computations can be based on time rather than on angles. For example, it has been assumed that the motor 14 rotates the receptor means 12 at an angular speed of 90 rpm which translates into an angular displacement of 540° each second. That is, the receptor means 12 rotates one and one-half times each second. Assuming that ninety samples are to be taken at one-degree increments throughout the 90° scanning angle and further assuming that the platform 10 is in the reference position of FIG. 1, the first sample will occur 83.33 milliseconds after the receptor means 12 passes its reference position 46. This is derived by dividing the 45° which the receptor means 12 must move from its reference position to its first position of scan by the angular displacement of 540° per second. Likewise, the second sample would occur at 85.19 milliseconds (46°/540°/ second) after the receptor means 12 has passed its reference position.

Although a time basis may be easier to implement in a microcomputer, it is contemplated that the control can also be based directly on the angular measurements if desired. It is also to be noted that to control the invention based on time, a scanner device which can be accurately maintained at a constant velocity must be used.

In the operation of the preferred embodiment of the present invention, it is contemplated that the correction for the roll of the platform 10 will be performed only once during each revolution of the receptor means 12 because it is further contemplated that in the preferred embodiment the platform 10 will not roll more than can be adequately compensated once during each revolution. This is so because the preferred embodiment of the present invention is contemplated to be used on a relatively slow-rolling, remotely-operated submersible vehicle, for example. Although in the preferred embodiment this compensation occurs only once each revolution, the present invention can be compensated more often or less often as the particular usage dictates.

It is also contemplated that the present invention can be utilized in various other applications. For example, it can be mounted in an airplane and used to scan the surface of the earth to detect certain minerals. The present invention can also be used in LANDSAT satellites.

Thus, the present invention is well adapted to carry out the objects and attain the ends and advantages mentioned above as well as those inherent therein. While preferred embodiments of the invention have been described for the purpose of this disclosure, numerous changes in the construction and arrangement of parts and steps can be made by those skilled in the art, which changes are encompassed within the spirit of this invention as defined by the appended claims.

What is claimed is:

1. A roll-compensating scanning apparatus, comprising:
    a scanner platform having a scanner platform reference position and being susceptible to rotation from said scanner platform reference position about an axis;
    scanner means, mounted on said scanner platform, for scanning an object in discrete paths, said scanner means including:
        receptor means for receiving input from said object, said receptor means being positionable in a receptor means reference position; and
        rotator means for continuously rotating said receptor means in a scanning direction through a scanning angle, said scanning angle commencing at a first location relative to said receptor means reference position when said scanner platform is at said scanner platform reference position;
    detector means for detecting a roll angle through which said scanner platform rotates from said scanner platform reference position about said axis; and
    control means, responsive to said detector means, for commencing said scanning angle at a second location relative to said receptor means reference position when said roll angle is in a direction opposite said scanning direction and for commencing said scanning angle at a third location relative to said receptor means reference position when said roll angle is in said scanning direction.

2. An apparatus as described in claim 1, wherein:

said second location is defined by adding the magnitude of said roll angle to the magnitude of the angular displacement of said first location measured from said receptor means reference position; and said third location is defined by subtracting the magnitude of said roll angle from the magnitude of the angular displacement of said first location from said receptor means reference position.

3. A method of compensating for the rotation of a scanner platform about an axis, the scanner platform having a scanner device mounted thereon for scanning an object through a predetermined angle along a plurality of paths as the scanner platform is moved linearly relative to the object, comprising:

detecting the amount the scanner platform rotates about the axis; and moving the scanner device relative to the scanner platform so that a first center line passing through the predetermined angle and the midpoint of a first one of the paths is aligned with a second center line passing through the predetermined angle and the midpoint of a second one of the paths.

4. A method of compensating for the rotation of a scanner platform from a scanner platform reference position, the scanner platform having a scanner device mounted thereon for scanning an object in a scanning direction and through a scanning angle commencing from a first location when the scanner platform is in the scanner platform reference position, the first location being defined by an angular magnitude measured from a scanner device reference position, comprising:

detecting the magnitude and direction of a roll angle through which the scanner platform rotates from the scanner platform reference position;

adding the magnitude of the roll angle to the angular magnitude of the first location when the direction of the roll angle is opposite to the scanning direction thereby defining location;

commencing at the second location a subsequent scan of the object through the scanning angle;

subtracting the magnitude of the roll angle from the angular magnitude of the first location when the direction of the roll angle is in the scanning direction, thereby defining a third location; and commencing at the third location a subsequent scan of the object through the scanning angle.

* * * * *